Aug. 15, 1950    J. F. GORDON    2,519,331
PHASE INDICATOR
Filed Oct. 2, 1947
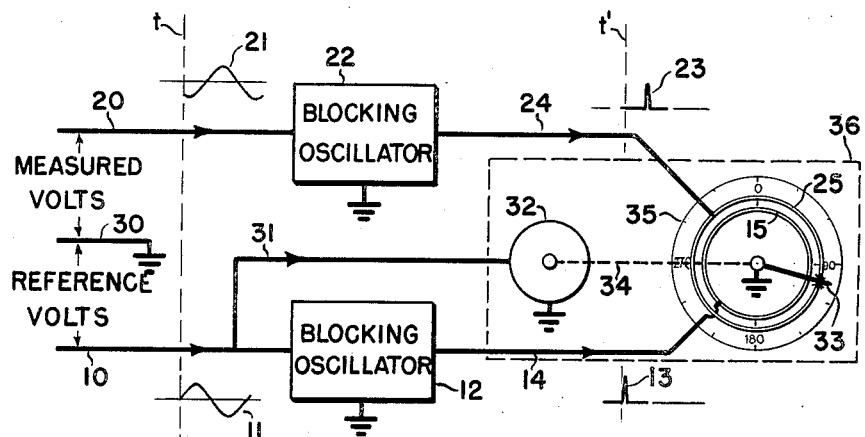
FIG_1
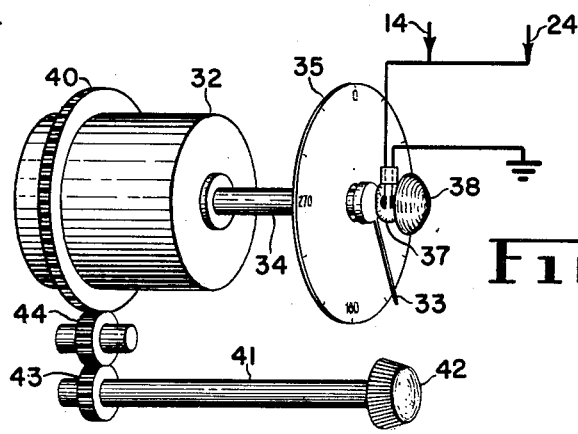
FIG_2
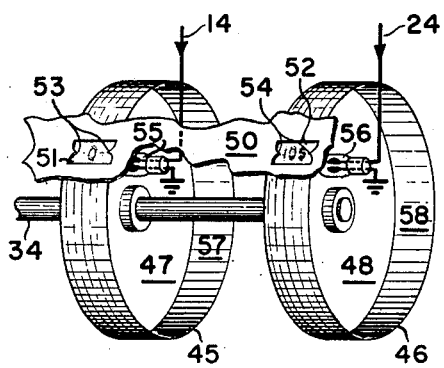
FIG_3
Inventor
JAMES F. GORDON
By Robert T. Killman
Attorney Patented Aug. 15, 1950

2,519,331

UNITED STATES PATENT OFFICE 2,519,331

PHASE INDICATOR

James F. Gordon, Towson, Md., assignor to Bendix Aviation Corporation, Towson, Md., a corporation of Delaware Application October 2, 1947, Serial No. 777,519

10 Claims. (Cl. 172—245)

This invention relates to phase indicators, and more particularly to a means for indicating the phase relation of electrical energy from two separate sources in which the frequencies of the alternating currents are alike and of a low rate useful for commercial power.

The measurement of the phase difference of an alternating current energy from one source with respect to that of another source of like energy has been accomplished by using the alternations of one of the energy sources to control the time of initiation of each cycle of the energy of the other source and then metering the output current with a phase calibrated meter. Another means of phase determination used in the past involved control of the vertical and the horizontal positioning of a cathode-ray beam by each of the two energy sources and observation of the phase relation as indicated by the position of the beam trace upon the face of the cathode-ray tube. Such methods are generally cumbersome in that considerable electronic equipment is involved.

An object of this invention is to provide a means of phase measurement which is simple in construction and requires a minimum of space.

Another object of this invention is to provide a means of phase measurement which does not require calibration with some external standard in order to determine its accuracy.

A further object of this invention is to provide a means of phase measurement which measures equally well all phase relations from 0° to 360°.

Other objects and advantages will become apparent from a consideration of the following specification when taken in conjunction with the accompanying drawing, in which, Fig. 1 is a diagram of a circuit embodying the invention, Fig. 2 is a view in perspective of the motor and rotating pointer with a variation of the indicating means, and Fig. 3 is a view in perspective of another variation of the indicating means.

Referring more particularly to Fig. 1, the circuit illustrated comprises a reference voltage input conductor 10, a conductor 20 for the voltage whose phase in relation to the reference voltage is to be measured, and a ground connection 30 common to both voltages.

Blocking oscillators 12 and 22 are excited respectively by the reference voltage and the voltage to be measured, the outputs of these oscillators being applied through leads 14 and 24 respectively to two concentrically located fluorescent rings 15 and 25.

A motor 32, energized by voltage of the reference phase through a lead 31 and ground, drives a pointer 33 by means of a shaft 34. The shaft with the hub of the pointer is concentric with a pair of rings 15, 25 and a dial 35 which is calibrated in degrees. The efficiency of the indicating means is improved by enclosing the rings, dial, and motor in a glass or glass and metal chamber 36 in which a vacuum or partial vacuum can be provided. The lines $t$ and $t'$ are instantaneous time references to which the alternating voltage wave forms 11, 21 and the voltage pulses 13, 23 are respectively referred in describing a phase difference.

For the measurement of phase the reference voltage, one cycle of which is indicated by the graph 11, is fed through the conductor 10 to a blocking oscillator 12 known in the art as a single-swing, externally excited type of blocking oscillator. The positive swing of corresponding half cycles of the input voltage unblocks the oscillator whereby it drives for one cycle and then blocks itself from any further operation till another input pulse repeats the original response. The output of the oscillator is shown by the graph 13 to be a peaked voltage pulse of short duration which is fed through the conductor 14 to the ring 15. The potential difference between the pulsed ring 15 and the adjacent grounded pointer 33 will cause the ring to glow at the point nearest the pointer. The pointer revolves in close proximity to the rings 15 and 25.

One cycle of the measured voltage of the same alternating frequency as the reference voltage is indicated in the graph 21. The phase difference of the measured voltage with respect to the reference voltage is such as is evident by their relation to the common time line $t$. This measured voltage is fed to the blocking oscillator 22 which is identical with oscillator 12. The voltage output of oscillator 22, as shown by the graph 23, is like the output 13 but is removed a distance from the time line $t'$ equal to the difference in phase of the initiating voltages 11 and 21. Conductor 24 feeds the pulsed output of oscillator 22 to the ring 25 which is in a common plane with ring 15 and adjacent to the plane inscribed by the rotating pointer 33. Said ring will likewise glow at the point nearest the grounded pointer when the voltage of the ring is suddenly increased.

The pointed 33, through the motor 32, is controlled by the reference voltage and is thus consistent with it. The motor is a synchronous motor which rotates once for every cycle of electrical energy which it helps to measure. Accordingly, if the input frequency is 60 cycles per second, then the revolutions per minute of the motor will be 3600. Since the motor and reference voltage operate in exact synchronization, the indication on the ring 15 at the time of the pulse 13 will be at the same point at each revolution of the pointer 33 and will serve as the index from which the phase angle is measured. The index point can be established on the calibrated dial either by positioning the dial with respect to the rings or by rotating the body of the motor till the desired index position is achieved.

The ring 25 will also glow at some point with the rotation of the pointer 33, but at an arc distance from the index point of ring 15 as established by the time difference of the pulses 13 and 23. Since these pulses are initiated by the reference and the measused voltages respectively, the arc separation of the point of glow on ring 25 from that of the indext point of glow of ring 15, as measured by the calibrated dial, will indicate directly the phase separation of the measured voltage from that of the reference voltage.

The construction of the rings 15 and 25 in order that a spark or glow may be produced in the vicinity of the pointer on the application of a pulse to one of the rings may follow principles known to the art. One manner of achieving the desired result is to construct the tubes of a transparent dielectric having higher dielectric strength than that of the air path between the pointer and the tube. A conductor extends inside the full length of the tube from the conductor 14 or 24. The outside of the tube is covered with a semi-conductor, for example, a sputtered coating of metal. The sputtered metal glows in the vicinity of the pointer. The tube may be filled with gas at a reduced pressure or to heighten the visibility of the glow, mercury vapor may be used inside the tube together with a coating of phosphor on the inside wall.

Another indicating means is disclosed in Fig. 2. The output pulses 13 and 23 are each fed to the same electrode of a neon glow lamp 37 whose remaining electrode is grounded. Said pulses cause the lamp to glow at respective times in the rotation cycle of the pointer 33 so as to illuminate the pointer and the dial. The positions of the pointer with respect to the dial are observed only at the moments of illumination and therefore indicate directly the phase difference of the two alternating current voltages which control the illumination of the dial. Reflector 38 directs the illumination upon the face of the dial and shields the eyes of the observer from the direct glow of the lamp.

The gear 40 is mounted to the body of the motor to provide a convenient means of changing the rotary position of the motor in order to establish the pointer 33 at a desired index position with respect to the dial 35. A shaft 41 extends from a front panel knob 42 to a driven gear 43 which engages an idling gear 44 to jointly drive gear 40 fastened to the body of the motor 32. The idling gear 44 cause the direction of rotation of the motor 32 to be consistent with that of the knob 42.

Another means of phase indication is illustrated in Fig. 3 where two separate, translucent, circular bands 45, 46, mounted upon and rotated by discs 47 and 48 respectively, are each calibrated in degrees for the full 360° of their circumference. Adjacent to the outer face of each band are windows 51, 52 in the panel 50 which serves to enclose the unit. Pointers 53, 54 respectively extend from the lateral sides of each window and provide marker points for accurate reading of the position of the rotating bands with respect to the stationary windows.

Two neon glow lamps 55, 56 are respectively mounted adjacent to the inner faces 57, 58 of the translucent bands 45, 46 and in positions directly behind the respective windows 51, and 52. The lamp 55 is energized from oscillator 12 through lead 14 and momentarily illuminates the transparent band 45 at the area of window 51 so that the degree markings imprinted on the band are easily read. The band 57 with its cooperating disc 47 is mounted on and rotated by shaft 32 at the synchronous speed previously described. The lamp 56 is energized by the pulsed voltages from oscillator 22 through conductor 24 and, like lamp 55, momentarily illuminates its respective band 46 which is also driven by shaft 32.

The indications observed in the two windows 51, 52 are stroboscopic pictures of the instantaneous positions of the two bands 45 and 46 as they are respectively lighted by the lamps 55, 56. The indication of window 51 will provide the index position of shaft 32 with the reference voltage so that the indication in window 52 will read the accurate phase difference in degrees between the measured voltage and the reference voltage.

It will be evident from the foregoing that this invention is not limited to the specific circuits and arrangements of parts shown and disclosed herein for illustration but that the underlying concept and principle of the invention are susceptible of numerous variations and modifications coming within the broader scope and spirit thereof as defined by the appended claims. The specification and drawing are accordingly to be regarded in an illustrative rather than a limiting sense.

What is claimed is:

1. Means for measuring and indicating the phase relation of two alternating voltages comprising; a pair of voltage responsive pulse forming circuits, means applying each of said voltages to a respective one of said circuits, the pulse outputs of both said circuits having identical time correspondence with the voltages from which they were derived, circular scale means, means for selectively designating a point on said scale means, drive means mechanically establishing and maintaining cyclic relative movement between said scale means and said designating means in synchronism with one of said alternating voltages, pulse responsive means for illuminating the portion of said scale means adjacent the point designated by said designating means, said illuminating means being normally unilluminated, and means applying said pulses to said illuminating means.

2. Means for measuring and indicating the phase relation of two alternating voltages comprising; a pair of blocking oscillators, means applying each of said voltages to a respective one of said oscillators thereby deriving from each voltage a series of pulses, circular scale means, means for selectively designating a point on said scale means, drive means mechanically establishing and maintaining cyclic relative movement between said scale means and said designating means in synchronism with one of said alternating voltages, pulse responsive means for illuminating the portion of said scale means adjacent the point designated by said designating means, said means being normally unilluminated, and means applying the outputs of said blocking oscillators to said illuminating means.

3. Means for measuring and indicating the phase relation of two alternating voltages comprising; a pair of voltage responsive pulse forming circuits, means applying each of said voltages to a respective one of said circuits, the pulse outputs of said circuits having identical time correspondence with the voltages from which they were derived, continuous scale means, means for selectively indicating a point on said scale means, drive means mechanically establishing and maintaining cyclic relative movement between said scale means and said designating means in synchronism with one of said alternating voltages, pulse responsive means for illuminating the portion of said scale means adjacent the point designated by said designating means, said illuminating means being normally unilluminated, and means applying said pulses to said illuminating means.

4. Means for measuring and indicating the phase relation of two alternating voltages comprising; a pair of pulse forming circuits, means applying each of said voltages to a respective one of said circuits, the pulse outputs of said circuits having identical time correspondence with the voltages from which they were derived, circular scale means, a pair of circular gas filled translucent tubes concentric with said scale, each of said circuits being connected to a respective one of said tubes, a conductive pointer, said pointer being continuously driven about said tubes in synchronism with one of said voltages and in such coupling relation thereto as to complete a circuit through either of said tubes upon the generation of a pulse in the circuit to which it is connected, the gas filling of said tubes being of such character and condition that a glow is produced therein in the vicinity of said pointer upon the generation of one of said pulses.

5. Means for measuring and indicating the phase relation of two alternating voltages comprising; a pair of pulse forming circuits, means applying each of said voltages to a respective one of said circuits, the pulse outputs of said circuits having identical time correspondence with the voltages from which they were derived, a circular scale means, a pair of circular illuminating elements concentric with said scale, each of said elements being connected to a respective one of said circuits, a conductive pointer driven around said scale and said elements in synchronism with one of said voltages, said pointer being in such coupling relation to said elements and said elements being so constructed that upon the generation of a pulse in one of said circuits the element connected thereto will be illuminated in the vicinity of said pointer.

6. Means for measuring and indicating the phase relation of two alternating voltages comprising; a pair of pulse forming circuits, means applying each of said voltages to a respective one of said circuits, the pulse outputs of said circuits having identical time correspondence with the voltages from which they were derived, a circular scale, a pointer driven about said scale in synchronism with one of said voltages, a pulse responsive lamp positioned to illuminate the face of said scale and said pointer, and means connecting said lamp to both of said circuits, said lamp being illuminated only upon the generation of a pulse in one of said circuits.

7. Means for measuring and indicating the phase relation of two alternating voltages comprising; a pair of pulse forming circuits, means applying each of said voltages to a respective one of said circuits, the pulse outputs of said circuits having identical time correspondence with the voltages from which they were derived, a circular scale, a pointer driven about said scale in synchronism with one of said voltages, and means momentarily illuminating the face of said scale and said pointer upon the generation of a pulse in one of said circuits.

8. Means for measuring and indicating the phase relation of two alternating voltages comprising; a pair of voltage responsive pulse forming circuits, means applying each of said voltages to a respective one of said circuits, the pulse outputs of said circuits having identical time correspondence with the voltages from which they were derived, a pair of identical endless translucent scale elements driven simultaneously in synchronism with one of said voltages, means masking all except a small portion of each of said scales from the view of an observer, and a normally unilluminated light positioned behind each of said portions, means connecting each of said lights to a respective one of said circuits whereby it is illuminated upon the generation of a pulse in the circuit to which it is connected.

9. Means for measuring and indicating the phase relation of two alternating voltages comprising; a pair of voltage responsive pulse forming circuits, means applying each of said voltages to a respective one of said circuits, the pulse outputs of said circuits having identical time correspondence with the voltages from which they were derived, a pair identical endless translucent scale elements driven simultaneously in syncronism with one of said voltages, means masking all except a small portion of each of said scales and means illuminating each of said portions from behind upon the generation of a pulse in a respective one of said circuits.

10. Means for measuring and indicating the phase relation of two alternating voltages comprising; a pair of voltage responsive pulse forming circuits, means applying each of said voltages to a respective one of said circuits, the pulse outputs of said circuits having identical time correspondence with the voltages from which they were derived, a pair of identical endless indicia bearing scale elements driven simultaneously in synchronism with one of said voltages, means masking all except a small portion of each of said scales and means illuminating each of said portions in a manner to render visible to an observer the indicia borne thereby upon the generation of a pulse in a respective one of said circuits.

JAMES F. GORDON.

REFERENCES CITED

The following references are of record in the file of this patent:

UNITED STATES PATENTS

| Number | Name | Date |
|---|---|---|
| 1,964,776 | Zuschlag | July 3, 1934 |
| 2,118,483 | Woodman | May 24, 1938 |
| 2,178,074 | Jakel et al. | Oct. 31, 1939 |
| 2,374,817 | Hardy | May 1, 1945 |
| 2,422,386 | Anderson | June 17, 1947 |
| 2,439,877 | Stuart | Apr. 20, 1948 |